United States Patent
Wieland et al.

(10) Patent No.: US 10,356,329 B2
(45) Date of Patent: Jul. 16, 2019

(54) METHOD FOR CORRECTING THE ZOOM SETTING AND/OR THE VERTICAL OFFSET OF FRAMES OF A STEREO FILM AND CONTROL OR REGULATING SYSTEM OF A CAMERA RIG HAVING TWO CAMERAS

(76) Inventors: Christian Wieland, Augsburg (DE); Matthias Lenz, Friedberg (DE)

( * ) Notice: Subject to any disclaimer, the term of this patent is extended or adjusted under 35 U.S.C. 154(b) by 1040 days.

(21) Appl. No.: 14/233,706

(22) PCT Filed: Jul. 27, 2012

(86) PCT No.: PCT/EP2012/003212
§ 371 (c)(1),
(2), (4) Date: Nov. 5, 2014

(87) PCT Pub. No.: WO2013/017246
PCT Pub. Date: Feb. 7, 2013

(65) Prior Publication Data
US 2014/0362185 A1    Dec. 11, 2014

(30) Foreign Application Priority Data
Aug. 3, 2011    (DE) .................. 10 2011 109 301

(51) Int. Cl.
| | |
|---|---|
| H04N 5/232 | (2006.01) |
| H04N 13/204 | (2018.01) |
| G02B 27/22 | (2018.01) |
| H04N 13/246 | (2018.01) |
| H04N 13/239 | (2018.01) |

(52) U.S. Cl.
CPC ......... *H04N 5/23296* (2013.01); *G02B 27/22* (2013.01); *H04N 13/204* (2018.05); *H04N 13/239* (2018.05); *H04N 13/246* (2018.05)

(58) Field of Classification Search
CPC ................ H04N 5/23296; H04N 13/0203
See application file for complete search history.

(56) References Cited

U.S. PATENT DOCUMENTS

| | | | |
|---|---|---|---|
| 2,370,611 A | 2/1945 | Du | |
| 2,603,134 A | 7/1952 | Burnam | |
| 2,712,779 A | 7/1955 | Tolcher | |
| 2,746,369 A | 5/1956 | Beard | |
| 2,753,778 A | 7/1956 | Tolcher | |
| 2,945,428 A | 7/1960 | Dearborn | |
| 3,006,052 A | 10/1961 | Stickney | |
| 3,126,187 A | 3/1964 | Mooney | |
| 3,371,589 A | 3/1968 | Hill | |
| 3,737,130 A | 6/1973 | Shiraishi | |
| 3,767,095 A | 10/1973 | Jones | |
| 4,943,820 A | 7/1990 | Larock | |
| 4,963,904 A | 10/1990 | Lee | |
| 5,359,381 A * | 10/1994 | Miyazawa | G02B 7/102 396/81 |
| 6,056,449 A | 5/2000 | Hart | |
| 6,068,223 A | 5/2000 | Navarro | |
| 6,457,880 B1 | 10/2002 | Slot et al. | |
| 7,191,923 B1 | 3/2007 | Kundig | |
| 8,128,295 B2 | 3/2012 | Pizzo et al. | |
| 8,783,973 B2 | 7/2014 | Pizzo et al. | |
| 2002/0154228 A1 * | 10/2002 | Matsumura | H04N 5/2628 348/240.2 |
| 2003/0156751 A1 * | 8/2003 | Lee | G06K 9/03 382/154 |
| 2005/0053307 A1 * | 3/2005 | Nose | G06T 3/0018 382/275 |
| 2005/0168616 A1 * | 8/2005 | Rastegar | H04N 5/2259 348/335 |
| 2005/0237385 A1 | 10/2005 | Kosaka et al. | |
| 2007/0075997 A1 | 4/2007 | Rohaly et al. | |

(Continued)

FOREIGN PATENT DOCUMENTS

| | | |
|---|---|---|
| GB | 2425185 A | 10/2006 |
| JP | 05-130646 | 5/1993 |

(Continued)

OTHER PUBLICATIONS

International Search Report for PCT/EP2012/003212 in 2 pages.
Japanese Office Action dated Mar. 8, 2016 in Japanese Application No. 2014-523219 in 8 pages.
Japanese Office Action dated Dec. 2, 2016 in Japanese Application No. 2014-523219 in 4 pages.
Office Action and translation in Japanese patent application No. 2014-523219 dated Oct. 27, 2017 in 2 pages.
International Search Report for PCT/US2009/006690 dated Mar. 10, 2010 in 2 pages.

(Continued)

*Primary Examiner* — Shawn S An
(74) *Attorney, Agent, or Firm* — Knobbe, Martens, Olson & Bear LLP

(57) ABSTRACT

The invention relates to a method for correcting the zoom setting and/or the vertical offset in an image assembled from two sub-frames of a stereo film, wherein the one sub-frame is provided by a first camera of a camera rig and the second sub-frame is provided by a second camera of the camera rig, wherein a vertical offset is changed via a change in the pitch setting, wherein, during the operation when recording the stereo film, a difference between the present zoom-results in the first sub-frame relative to the second sub-frame is measured and/or a vertical offset of the image points present in the first sub-frame in relation to those corresponding image points in the second sub-frame is measured and, on the basis of this information, correction values are calculated, with which the zoom difference and/or the vertical offset is reduced, given appropriate application to the zoom and/or pitch setting. The invention also relates to a controlling means or regulating means of a camera rig having two cameras, which is configured to carry out said method.

20 Claims, No Drawings

(56) References Cited

U.S. PATENT DOCUMENTS

| | | | |
|---|---|---|---|
| 2007/0139612 A1* | 6/2007 | Butler-Smith | H04N 13/271 351/201 |
| 2007/0146478 A1* | 6/2007 | Butler-Smith | H04N 5/262 348/47 |
| 2008/0002910 A1 | 1/2008 | Ojima et al. | |
| 2009/0128621 A1* | 5/2009 | Passmore | G06T 7/85 348/43 |
| 2010/0118150 A1* | 5/2010 | Boland | H04N 5/2259 348/207.1 |
| 2010/0306223 A1* | 12/2010 | Lee | G06F 17/3053 707/759 |
| 2011/0001847 A1 | 1/2011 | Iwasaki | |
| 2011/0050857 A1* | 3/2011 | Lee | H04N 13/0011 348/47 |
| 2011/0057948 A1 | 3/2011 | Witt et al. | |
| 2011/0117960 A1* | 5/2011 | Miura | G02B 7/102 455/556.1 |
| 2011/0169918 A1* | 7/2011 | Yoo | H04N 13/239 348/46 |
| 2011/0210965 A1 | 9/2011 | Thorpe | |
| 2012/0113278 A1* | 5/2012 | Okada | H04N 5/217 348/208.4 |
| 2012/0249730 A1 | 10/2012 | Lee | |
| 2015/0077521 A1 | 3/2015 | Borchert et al. | |

FOREIGN PATENT DOCUMENTS

| | | |
|---|---|---|
| JP | H6-105340 | 4/1994 |
| JP | 1996-251626 | 9/1996 |
| JP | H8-251626 | 9/1996 |
| JP | 2001/283246 | 10/2001 |
| JP | 2004-354257 | 12/2004 |
| JP | 2006-157432 | 6/2006 |
| JP | 2008/033897 | 2/2008 |
| JP | 2008-241491 | 10/2008 |
| JP | 2011-13425 | 1/2011 |
| JP | 2011-35642 | 2/2011 |
| JP | 2011-61788 | 10/2012 |
| WO | WO 2009/139740 | 11/2009 |
| WO | WO 2012/037075 | 3/2012 |

OTHER PUBLICATIONS

English Translation of Japanese Office Action in JP Application No. 2014-520542 dated Jun. 21, 2016 in 6 pages.

European Office Action dated Jul. 1, 2016 in EP Application No. 12720434.5 in 16 pages.

International Search Report dated Feb. 7, 2012 in PCT/EP2012/002038 in 3 pages.

Jager, T et al., "Blickrichtungsabhangige Scharfentiefereduzierung fur stereoskopische Displays", FKT Fernseh Und Kinotechnik, Fachverlag Schiele & Schon GmbH, Berlin, DE, vol. 63, No. 12, Dec. 1, 2009.

Mark Horton, Stereoscopic3D Post Using 3ality Digital 3flex SIP2100, Quantel White Paper, Nov. 1, 2008, pp. 1-14.

Sanjeev Koppal et al., "A Viewer-Centric Editor for 3D Movies", IEEE Computer Graphics and Applications, IEEE Service Center, New York, NY, vol. 31, No. 1, Jan. 1, 2011.

Zilly, F., et al. "Stan—an assistance system for 3d productions: from bad stereo to good stereo." Electronic Media Technology (CEMT), 2011 14th ITG Conference on. IEEE, 2011.

* cited by examiner

METHOD FOR CORRECTING THE ZOOM SETTING AND/OR THE VERTICAL OFFSET OF FRAMES OF A STEREO FILM AND CONTROL OR REGULATING SYSTEM OF A CAMERA RIG HAVING TWO CAMERAS

FIELD OF THE INVENTION

The invention relates to a method for correcting the zoom setting and/or the vertical offset in an image assembled from two frames of a stereo film, wherein one frame is provided by a first camera of a camera rig and the second frame is provided by a second camera of the camera rig, wherein a vertical offset is changed via a change in the pitch setting. In other words it concerns the adjustment of the zoom difference and/or the vertical offset between single images of a stereo image pair.

The zoom setting has influence on the size of the image, in other words how much of the image is represented such that the content is distributed over a certain number of fillable pixels. A vertical offset is understood to mean the offset between two corresponding image points from a first sub-frame to a second sub-frame, wherein both sub-frames overlaid together form a common image which is projectable onto a screen or can be shown on an image reproducing device, such as a television. Such an image causes for the viewer a three-dimensional effect and is part of a 3D-film which is also known as stereo film.

The three-dimensional effect is achieved in that each eye of the viewer fixes on one of the two sub-frames and, because of the horizontal offset of an image point relative to the corresponding image point in the other of the two sub-frames, a spatial effect results in the brain of the viewer. This 3D-effect is also known as depth effect.

The pitch setting influences the line of sight of a camera when pivoting in a perpendicular plane.

It is known from prior art to calibrate, before the operation of recording the stereo film, the two cameras of a camera rig which is used for the capturing of a stereo film. For that reason, a plurality of focal lengths/zoom levels are set before the recording of the stereo film and each deviation is captured by an image processor. The deviations are compared with correction values which are saved in a so-called basis table.

According to this basis table, correction values for each zoom setting, i.e. for each focal length, are used.

However during the operation many external factors are to be compensated for, such as temperature rises from solar radiation or from the motors present and active in the camera rig, inertia, backlash/tolerance, etc. It is the object of the present invention to offer a remedy and improvement here so that also during the filming, i.e. during the recording of a stereo film, both of the sub-frames which jointly form an image always optimally align or match up with respect to their zoom-offset and their vertical offset. Such a zoom mismatch or a vertical displacement should be compensated during long term operation and also preferably immediately.

The object is achieved according to the invention in that, during the operation when recording the stereo film, a difference between the zoom results that are present in the first frame relative to the second frame is measured and/or a vertical offset of the image points in the first frame in relation to these corresponding image points in the second frame is measured and, on the basis of this information, correction values are calculated with which the zoom difference and/or the vertical offset is reduced given appropriate application to the zoom setting and/or pitch setting.

Advantageous embodiments are claimed in the dependent claims and are explained in more detail below.

Thus it is advantageous when the control of the camera rig eliminates the zoom difference and/or the vertical offset between the two sub-frames, in correspondence with the correction value. Also a purely digital image correction is possible.

It is further advantageous when a time value is assigned to each correction value. This time value can also be denoted as time stamp and denotes the point in time when the correction value was generated. In this way it can always be traced, when in the stereo filming a correction value was carried out/created.

Every correction value comprises a correspondingly associated confidence value. Such a confidence value denotes the quality of the image analysis performed by an image processor, on whose basis the correction value was generated. In this way a confidence measure is also linked with each correction value. Sections between previously made corrections are filled by interpolation, provided that they do not exceed a predefined maximum distance on the abscissa, so that correction values are made available also for these unvisited sections. By means of the interpolation, a supplement via additional new correction values is achieved even for the zoom settings and/or pitch settings which were not explicitly affected, in (correspondingly) close/nearby new correction values. The interpolation is preferably performed in dependence on the time values and/or confidence values of the accompanying correction values.

The correction values are always created or implemented at the motor and recorded in a correction table. Two variants are feasible here which differ in whether the correction table formed from the correction values and their interpolation is used immediately for the correction of the zoom setting and/or the pitch setting of a camera of the camera rig so that immediately, i.e. during the filming, a positive change is achieved, or whether it is used with a time delay, in other words only after explicit approval from an operator. In this way, in the aforementioned second case, a manual control loop can be established which prevents incorrect operations or incorrect calculations. To explain, it should be noted that the control of the motors realises a regulating system. Each correction is in this way implemented immediately at the motor. The two variants therefore differ in whether the table formed of the individual corrections, which also contains sections obtained with the help of interpolation, is used immediately, which has the advantage that, upon a renewed visit of a focal length, correction does not have to be made again, because the values of the correction table are immediately applied as determined in a previous run.

It has been found that it is advantageous when the zoom correction values are stored in a first or second zoom correction value table in dependence on the zoom direction that was active when the correction values were calculated. The different camera behaviour depending on the zoom direction is then taken into account. Thus, when it is established, during zooming into the image for example, that a zoom mismatch is present between the left and the right sub-frame, it is advantageous if the image; which still has not been zoomed far enough, is zoomed further. The original zoom direction which has lead to the present end position is then continued on the image which has not been sufficiently zoomed. The quality of the method for correcting the zoom setting and/or the vertical offset is thus improved.

An advantageous exemplary embodiment is characterized in that the correction values are computationally linked to a graph, and control values in regions of the graph in which the slope/curvature is larger than a predefined limit are not applied to the zoom setting and/or pitch setting, i.e. they are only recorded as candidates but are still not considered in the forming of the interpolated value. To explain, it should be noted that after each new correction, the interpolant is adjusted on a test basis. However if areas exist with too great a slope/curvature relative to a predefined value, then the latest, i.e. the triggering correction receives candidate status and the newly formed interpolant is not yet adopted. Corrections therefore have to respect a maximum allowable slope or maximum allowable curvature in relation to their neighbours. Corrections which violate the maximum allowable slope/maximum allowable curvature are realized at the motor and recorded as a candidate in order to wait for a suitable repetition. Only then do these corrections which violate the maximum allowable slope/maximum allowable curvature become a fully-fledged component of the correction table and its interpolants.

It is further advantageous when the graph at a point in time defined by the user is defined as a new calibration curve whose correction values serve from this point in time as a default setting with respect to the zoom setting and/or pitch setting. Thus a new basis calibration curve is defined which is formed from the old, not yet corrected values and new values, wherein the new values modify the values previously contained in the basis table, by means of which the self-set correction values, the respective zoom settings and/or the pitch settings are changed.

It is advantageous when the interpolated correction values are calculated in dependence on the proximity to the previously found correction values. Thus a direct link is enforced between found correction values and interpolated correction values.

The invention also relates to a control or regulating system of a camera rig having two cameras, which is designed to carry out the method according to the invention as well as a method for pure digital image correction.

In other words, it is as follows:

While the base tables created during calibration are subject to an ageing process, such as through temperature, gravity, backlash/tolerance etc., a remedy is provided here by the invention. On-line correction functions for zoom and/or average vertical offset are provided which come into effect when the corresponding image error exceeds a fixed amount and is not just zoomed. All performed corrections are collected in correction tables, periodically defined selection criteria are undergone and finally combined with the existing basis tables so that, after a few zoom settings, these correspond to the changed situation, because interpolated values are available for unvisited focal lengths. The decision to update the base tables, is however made by the user. For the average vertical offset there is a correction table with approximately symmetrical tilt. There are however two correction tables for the zoom setting, one for the forwards zoom and one for the backwards zoom.

The performed corrections are either limited to a point and transient or they have influence in a local region of the correction table:

Corrections with sufficient confidence value have local influence, i.e. they fit the correction tables in their surroundings continuously such that, in case of a new visit to the same position, the corrected motor value has already been accepted.

Corrections at which a predefined maximum slope/maximum curvature would have been exceeded within the interpolant, and corrections with too low a confidence value, are simply local/for one value only and transient, i.e. they are realised at the motor and recorded as candidates but without having influence on the correction table, a so-called Auto-Clear is performed, i.e. upon a new visit of the same position, a correction must be made again. Auto-Clear thus means that the introduced correction is furthermore reduced again and again with each subsequent zoom change, i.e. the correction values of the basis table are returned to again.

Interpolation is done between two corrections with local influence if they do not exceed a predefined maximum distance to the abscissa of the correction table, in other words the focal length. However it is not extrapolated if possible.

A recent correction having a small distance to an older one replaces the older one:

Corrections can replace each other when they exceed a minimum distance in relation to the abscissa of the correction table. The distance within which a replacing takes place is called a replacement corridor and its width is dependent on the age of the correction to be replaced, i.e. the older the correction, the wider the corridor.

A recent correction with local influence replaces an older one, insofar as this older one has local influence. If the older one is of the local/for one value only and transient type, in other words a candidate, it does not undergo replacement. The older one continues to exist as a candidate.

A current correction of the local/for one value only and transient type replaces an older one as long as this older one is also of the local/for one value only and transient type. If the older one has local influence, it does not undergo replacement. The newer correction becomes a candidate in addition to the older one.

The replacement of a correction is recorded. Repeated replacements of similar magnitude, that is in relation to the ordinate of the correction table, are counted. Every captured correction has such a counter. Its value is called repetition weight.

Adjacent corrections of similar magnitude reinforce each other:

If a point on the abscissa, that is to say a focal length, is visited, which point lies in the replacement corridor of an older correction with local influence and no re-correction is necessary, then the repetition weight of this older one increases.

Small corrections based on an interpolated position confirm the two adjacent corrections that have given rise to this interpolation. Its repetition weight is increased. Its time stamp is set to that of the current correction.

Only candidates with a defined repetition have influence on the structure of the correction table. Depending on the weight and repetition of the candidate, and the age and weight of the existing neighbours, up to three corrections are so modified that the maximum slope/maximum curvature is finally respected:

Candidates whose repetition weight exceeds a predefined value have influence on the correction table in that they are so attenuated that the maximum allowable slope/maximum allowable curvature is not violated by interpolation. If a candidate exists near a correction with local influence, it only occurs if the repetition weight of the candidate exceeds that of the other correction by a predefined value. It is advantageous, when the two neighbours of the candidate are also attenuated together in accordance with their age and/or their confidence weights and/or their repetition weight, that is to say they approach the candidate to a certain extent, that the attenuation is thus distributed.

The correction table in its current form can be periodically subjected to a process that limits the number of control values to a predefined maximum number, in such a way that younger and/or more reliable corrections remain.

Predefined values and/or decision-making patterns can be subject to a learning process, e.g. in that a plurality of possible interpolants is managed in parallel, based on different parameter sets, and/or decision-making patterns, and that each newly made correction leads to an evaluation of all of these interpolants. In the course of the operation the best working combination of parameter set and rule collection can emerge.

In general, the mechanisms described above are applicable to all corrections which can be represented by a one-dimensional look-up table, such as a height offset.

The invention claimed is:

1. A method for correcting the zoom setting and the vertical offset in an image assembled from two sub-frames of a stereo motion video recording, comprising:
  receiving a first sub-frame from a first camera having a first sensor;
  receiving a second sub-frame from a second camera having a second sensor;
  measuring:
    a zoom difference between the first sub-frame and the second sub-frame; and
    a vertical offset of at least one image point present in the first sub-frame in relation to at least one corresponding image point in the second sub-frame;
  calculating, with an image processor, one or more correction values based on the zoom difference and the vertical offset;
  computationally linking the one or more correction values to a graph; and
  reducing the zoom difference and the vertical offset based on the correction values, wherein the one or more correction values corresponding to a region of the graph in which the slope/curvature is greater than a predefined limit are not applied to the zoom difference and the vertical offset.

2. The method of claim 1, wherein the reducing step eliminates one or more of the zoom difference and the vertical offset.

3. The method of claim 1, further comprising assigning one or more of a time value and a confidence value to the one or more correction values.

4. The method of claim 1, further comprising calculating one or more interpolated correction values between two of the one or more correction values.

5. The method of claim 4, wherein the calculating the one or more interpolated correction values depends on its proximity to the one or more correction values.

6. The method of claim 4, wherein the interpolating is dependent on one or more of a time value and a confidence value assigned to the one or more correction values.

7. The method of claim 1, wherein said reducing comprises using the one or more correction values during recording to adjust one or more of a zoom setting of the first camera, a zoom setting of the second camera, a pitch setting of the first camera, and a pitch setting of the second camera.

8. The method of claim 1, further comprising storing in one of a first zoom correction value table and a second zoom correction value table the one or more correction values calculated from the zoom difference, wherein the storing is dependent on a zoom direction which was the basis of determination for one or more correction values calculated from the zoom difference.

9. The method of claim 1, wherein the graph is a new calibration curve whose correction values are used in combination with one or more values of a basis table as a default setting with respect to the zoom setting of the first camera, zoom setting of the second camera, pitch setting of the first camera, and pitch setting of the second camera.

10. The method of claim 1, wherein the measuring step is done while capturing a stereo recording.

11. The method of claim 1, wherein the vertical offset is adjusted by changing one or more of a pitch setting of the first camera and a pitch setting of the second camera with respect to each other.

12. The method of claim 1, wherein the zoom difference is adjusted by changing one or more of a zoom setting of the first camera and a zoom setting of the second camera with respect to each other.

13. The method of claim 1, wherein the reducing the zoom difference and the vertical offset comprises changing, based on the correction values, one or more of a zoom setting of the first camera, a zoom setting of the second camera, a pitch setting of the first camera, and a pitch setting of the second camera.

14. The method of claim 1, wherein the first sub-frame has a first zoom value determined by a zoom setting of the first camera, and at least one first image point determined by a pitch setting of the first camera.

15. The method of claim 1, wherein the second sub-frame has a second zoom value determined by a zoom setting of the second camera, and at least one second image point determined by a pitch setting of the second camera.

16. The method of claim 1, wherein the vertical offset is the vertical distance between at least one first image point contained in the first sub-frame and at least one second image point contained in the second sub-frame and corresponding to the at least one first image point.

17. A system configured to correct a zoom setting and the vertical offset in an image assembled from two sub-frames of a stereo recording, the system comprising:
  an image processor configured to:
    receive a first sub-frame from a first camera having a first sensor;
    receive a second sub-frame from a second camera having a second sensor;
    measure a zoom difference between the first sub-frame and the second sub-frame and a vertical offset of at least one image point present in the first sub-frame in relation to at least one corresponding image point in the second sub-frame;
    calculate one or more correction values based on the zoom difference and the vertical offset;
    computationally link the one or more correction values to a graph; and
    reduce the zoom difference and the vertical offset based on the correction values, wherein the one or more correction values associated with a region of the graph in which the slope/curvature is greater than a predefined limit are not applied to the zoom difference and the vertical offset.

18. The system of claim 17, wherein the image processor is further configured to assign one or more of a time value and a confidence value to the one or more correction values.

19. The system of claim 17, wherein the image processor is further configured to calculate one or more interpolated correction values between two of the one or more correction values.

20. The system of claim 17, wherein the image processor is further configured to store the one or more correction values calculated from the zoom difference in one of a first zoom correction value table and a second zoom correction value table, wherein the storing is dependent on a zoom direction which was the basis of determination for one or more correction values calculated from the zoom difference.

* * * * *